US011814009B2

(12) United States Patent
Shin et al.

(10) Patent No.: US 11,814,009 B2
(45) Date of Patent: Nov. 14, 2023

(54) ANTI-THEFT VEHICLE IMMOBILIZER USING BATTERIES

(71) Applicants: THE REGENTS OF THE UNIVERSITY OF MICHIGAN, Ann Arbor, MI (US); THE REGENTS OF THE UNIVERSITY OF COLORADO, Denver, CO (US)

(72) Inventors: Kang G. Shin, Ann Arbor, MI (US); Liang He, Denver, CO (US)

(73) Assignees: THE REGENTS OF THE UNIVERSITY OF MICHIGAN, Ann Arbor, MI (US); THE UNIVERSITY OF COLORADO, Denver, CO (US)

( * ) Notice: Subject to any disclaimer, the term of this patent is extended or adjusted under 35 U.S.C. 154(b) by 49 days.

(21) Appl. No.: 17/703,346

(22) Filed: Mar. 24, 2022

(65) Prior Publication Data
US 2022/0371547 A1    Nov. 24, 2022

Related U.S. Application Data

(60) Provisional application No. 63/165,790, filed on Mar. 25, 2021.

(51) Int. Cl.
*B60R 25/23* (2013.01)
*B60R 25/04* (2013.01)
(Continued)

(52) U.S. Cl.
CPC .............. *B60R 25/23* (2013.01); *B60R 25/04* (2013.01); *B60R 25/1001* (2013.01); *F02N 11/087* (2013.01); *F02N 11/0862* (2013.01)

(58) Field of Classification Search
None
See application file for complete search history.

(56) References Cited

U.S. PATENT DOCUMENTS 5,963,018 A * 10/1999 Guthrie .................. B60R 25/04
340/428
6,337,620 B1 * 1/2002 Chen ...................... B60R 25/24
340/5.72

(Continued)

FOREIGN PATENT DOCUMENTS

CN    2910670 Y  *  6/2007
CN    101722925 A  *  6/2010  ............. B60R 25/24
(Continued)

OTHER PUBLICATIONS

International Search Report and Written Opinion regarding Patent Application No. PCT/US2022/021867, dated Jul. 6, 2022.

*Primary Examiner* — Kevin R Steckbauer
(74) *Attorney, Agent, or Firm* — Harness, Dickey & Pierce, P.L.C.

(57) ABSTRACT

A driving authentication system is presented for a vehicle. The system includes: a dongle interfaced with a battery of the vehicle and an authenticator configured to receive a discharge current from the battery. The dongle operates to modulate discharge current from the battery with an input code; and the authenticator demodulate the input code from the discharge current, compares the input code to the one or more known authentication codes and, in response to the input code matching one of the one or more known authentication codes, controls power capacity of the battery.

16 Claims, 16 Drawing Sheets

(51) Int. Cl.
*B60R 25/10* (2013.01)
*F02N 11/08* (2006.01)

(56) References Cited

U.S. PATENT DOCUMENTS

| | | | | |
|---|---|---|---|---|
| 6,734,578 | B2 * | 5/2004 | Konno | B60R 25/02 |
| | | | | 70/237 |
| 6,809,636 | B2 * | 10/2004 | Metlitzky | B60R 25/241 |
| | | | | 340/5.1 |
| 2002/0180273 | A1 * | 12/2002 | Konno | G07C 9/00182 |
| | | | | 307/10.2 |
| 2004/0051631 | A1 * | 3/2004 | Metlitzky | B60R 25/04 |
| | | | | 340/426.11 |
| 2011/0200193 | A1 * | 8/2011 | Blitz | H04W 12/126 |
| | | | | 707/769 |
| 2022/0371547 | A1 * | 11/2022 | Shin | B60R 25/045 |

FOREIGN PATENT DOCUMENTS

| | | | | | |
|---|---|---|---|---|---|
| CN | 102107697 | A | * | 6/2011 | |
| CN | 101722925 | B | * | 7/2012 | ............. B60R 25/24 |
| CN | 102107697 | B | * | 2/2013 | |
| CN | 104245443 | B | * | 8/2016 | ............. B60R 25/01 |
| CN | 106427886 | A | * | 2/2017 | ............. B60R 25/20 |
| CN | 107651052 | A | * | 2/2018 | |
| CN | 110803237 | A | * | 2/2020 | |
| EP | 1084917 | A1 | * | 3/2001 | ............. B60R 25/04 |
| EP | 1262925 | A2 | * | 12/2002 | ............. B60R 25/02 |
| EP | 1262925 | B1 | * | 7/2004 | ............. B60R 25/02 |
| WO | WO-2022204468 | A1 | * | 9/2022 | ............. B60R 25/04 |

* cited by examiner

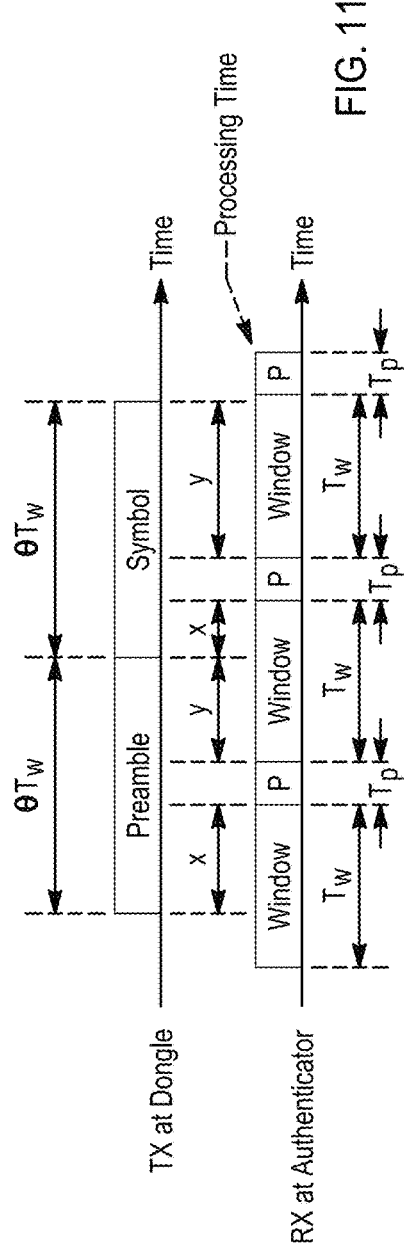
FIG. 11
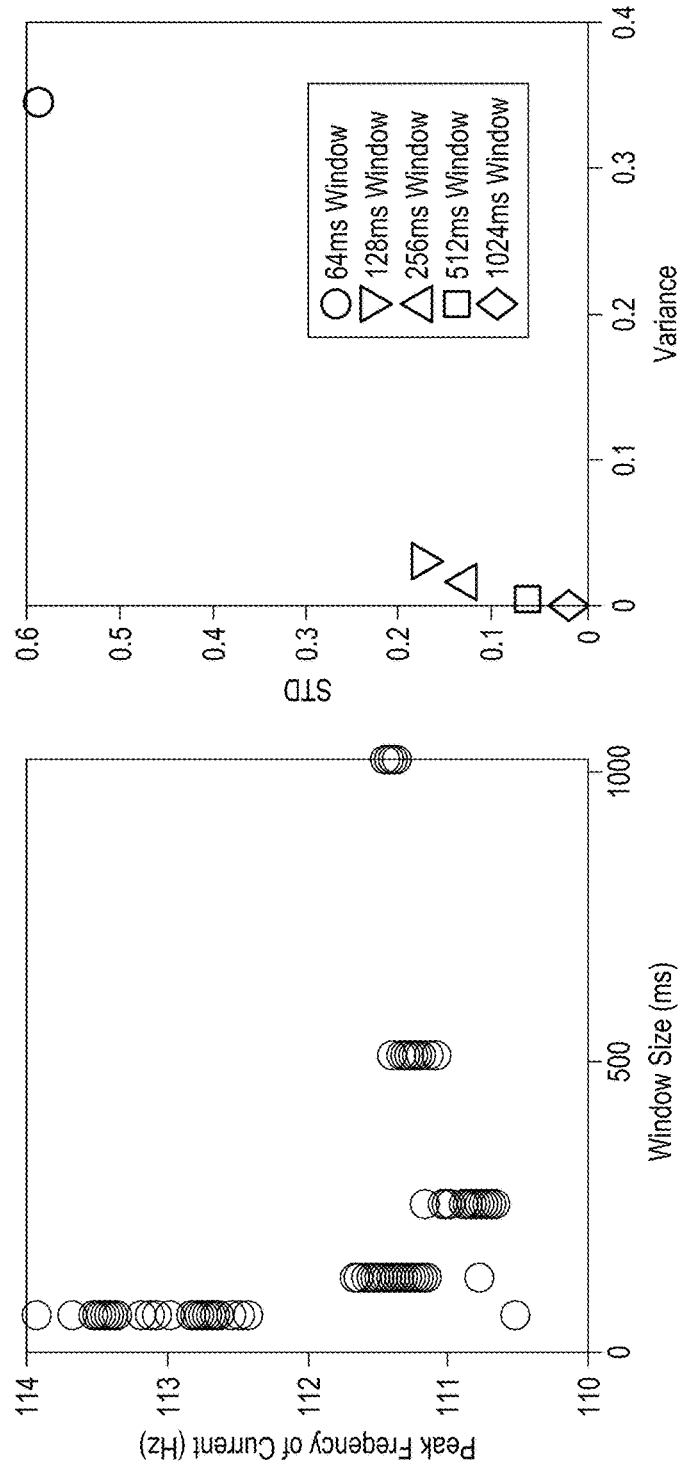
FIG. 12B
FIG. 12A

ANTI-THEFT VEHICLE IMMOBILIZER USING BATTERIES

CROSS-REFERENCE TO RELATED APPLICATIONS

This application claims the benefit of U.S. Provisional Application No. 63/165,790 filed on Mar. 25, 2021. The entire disclosure of the above application is incorporated herein by reference.

GOVERNMENT CLAUSE

This invention was made with government support under grant no. CNS1739577 awarded by the National Science Foundation. The Government has certain rights in the invention.

FIELD

The present disclosure relates to a driving authentication system for vehicles.

BACKGROUND

RF keys/keyfobs have been widely used as vehicle mobilizers to prevent auto thefts, which allow the cranking of engine only after validating a driver's identity by exchanging the authentication code wirelessly between the key/keyfob and the vehicle. Despite the pervasive deployment of key-based (im)mobilizers, 721,885 vehicles were stolen in the US in 2019 (i.e., 44 seconds/theft), costing $6.4B in total.

Two increasingly important factors attributing to these auto thefts are cyber vulnerabilities and single point of failure. Cyber vulnerabilities of key-based (im)mobilizers lead to a variety of attacks, such as jamming/relay attacks and key cloning. The German General Automobile Club tested 237 vehicle models by 33 automakers in 2019 to find 99% of them suffering from the flaws of wireless keys. Also, automotive cyber-security incidents have increased by more than 7× since 2016, most of which target the ignition keys. Key is a single point of failure, i.e., anyone with the key gains full control of the vehicle. This amplifies the risk of auto thefts, as seen by the increased auto thefts using keys (i.e., from 43,643 in 2013 to 81,911 in 2018) and the feasibility of cloning millions of car keys. Cyber vulnerabilities and single-point-of-failure are the top concerns of car owners with keys/keyfobs.

As an additional anti-theft measure, Tesla launched, and deployed on its Model S/X via over-the-air (OTA) updates, a PIN-To-Drive feature in 2018, which allows the driver to set a secure 4-digit verification code that must be entered via the touchscreen of the control panel before driving the car. However, this feature (or its variants) has only limited deployability, due to its requirements of (i) a pre-installed user interface (e.g., a touchscreen) which accepts driver inputs and communicates with the vehicle's engine control unit via the in-vehicle network (e.g., CAN and (ii) the subscription of OTA updates, neither of which is always available on other commodity vehicles. Moreover, the safety/security/legitimacy of OTA updates are still in debate.

The background description provided here is for the purpose of generally presenting the context of the disclosure.

SUMMARY

This section provides a general summary of the disclosure, and is not a comprehensive disclosure of its full scope or all of its features.

A driving authentication system is presented for a vehicle. The system includes a dongle interfaced with a battery of the vehicle, an authenticator, and a data store storing one or more authentication codes for the vehicle. The dongle operates to modulate discharge current from the battery in accordance with an input code. The authenticator is configured to receive a discharge current from the battery and operates to demodulate the input code from the discharge current. The authenticator compares the input code to the one or more authentication codes and, in response to the input code matching one of the one or more authentication codes, controls power capacity of the battery. For example, the authenticator restricts power capacity of the battery to an electric starter motor of the vehicle in response to a mismatch between the input code and the one of the one or more authentication codes.

In some embodiments, the dongle is interfaced via an auxiliary power outlet of the vehicle (e.g., through the 12V power network) to the battery.

In an example embodiment, the discharge current is modulated by the dongle using frequency-shift keying. More specifically, the discharge current is in form of a periodic waveform and the input code is comprised of two or more alphanumeric characters, such that value of an alphanumeric character is represented by frequency of the period waveform.

The driving authentication system further includes a switching circuit interconnecting the battery with an electric starter motor, where the switching circuit includes a low power circuit path, a high power circuit path and one or more switches that selectively connects the battery via the low power circuit path or the high power circuit path to the electric starter motor; and a controller interfaced with the one or more switches, wherein the controller controls power capacity of the battery by actuating the switch.

In some embodiments, a relay is interconnected between an alternator of the vehicle and at least one of the dongle or the authenticator, such that the at least of the dongle and the authenticator includes a rechargeable power supply and the relay is closed while engine of the vehicle is running, thereby recharging the rechargeable power supply.

In another aspect, the driving authentication system is comprised of a transmitter circuit, a receiver circuit, a switching circuit and a controller. The transmitter circuit is electrically coupled across a battery of the vehicle The transmitter circuit is configured to discharge a current from the battery in response to receiving an input code and modulate the discharge current in accordance with the input code. The receiver circuit is configured to receive the discharge current from the battery and operates to demodulate the input code from the discharge current. The switching circuit interconnects the battery with a vehicle starter module and a low power circuit path, a high power circuit path and at least one switch. The controller is interfaced with the receiver circuit and the switching circuit. The controller controls position of the at least one switch in accordance with the input code received from the receiver circuit.

The driving authentication system further includes a user input device interfaced with the transmitter circuit and configured to receive the input code from a user of the vehicle.

In some embodiments, the transmitter circuit modulates the discharge current using frequency-shift keying.

During operation, the controller compares the input code from the receiver circuit with one or more known authentication codes and, in response to the input code matching one of the known authentication codes, changing the position of the at least one switch to electrically connect the battery through the high power circuit path to the vehicle starter module. In some cases, the at least one switch electrically connects the battery through the low power circuit path before authentication and the low power circuit path includes a circuit breaker.

In some embodiments, the driving authentication system may further includes an alarm circuit configured to detect an open circuit in the low power circuit path and the high power circuit path and initiate an alarm in response thereto.

In some embodiments, the driving authentication system may further include an alarm circuit configured to detect removal of the receiver circuit and initiate an alarm in response thereto.

In some embodiments, the driving authentication system may further include an alarm circuit configured to detect removal of the transmitter circuit and initiate an alarm in response thereto.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The present disclosure will become more fully understood from the detailed description and the accompanying drawings.

FIG. 11 is a diagram depicting the asynchronous communication between the dongle and the authenticator.

FIGS. 12A and 12B are graphs showing the larger variance of peak frequency is observed when using a smaller moving window.

Corresponding reference numerals indicate corresponding parts throughout the several views of the drawings.

DETAILED DESCRIPTION

Figure 1:
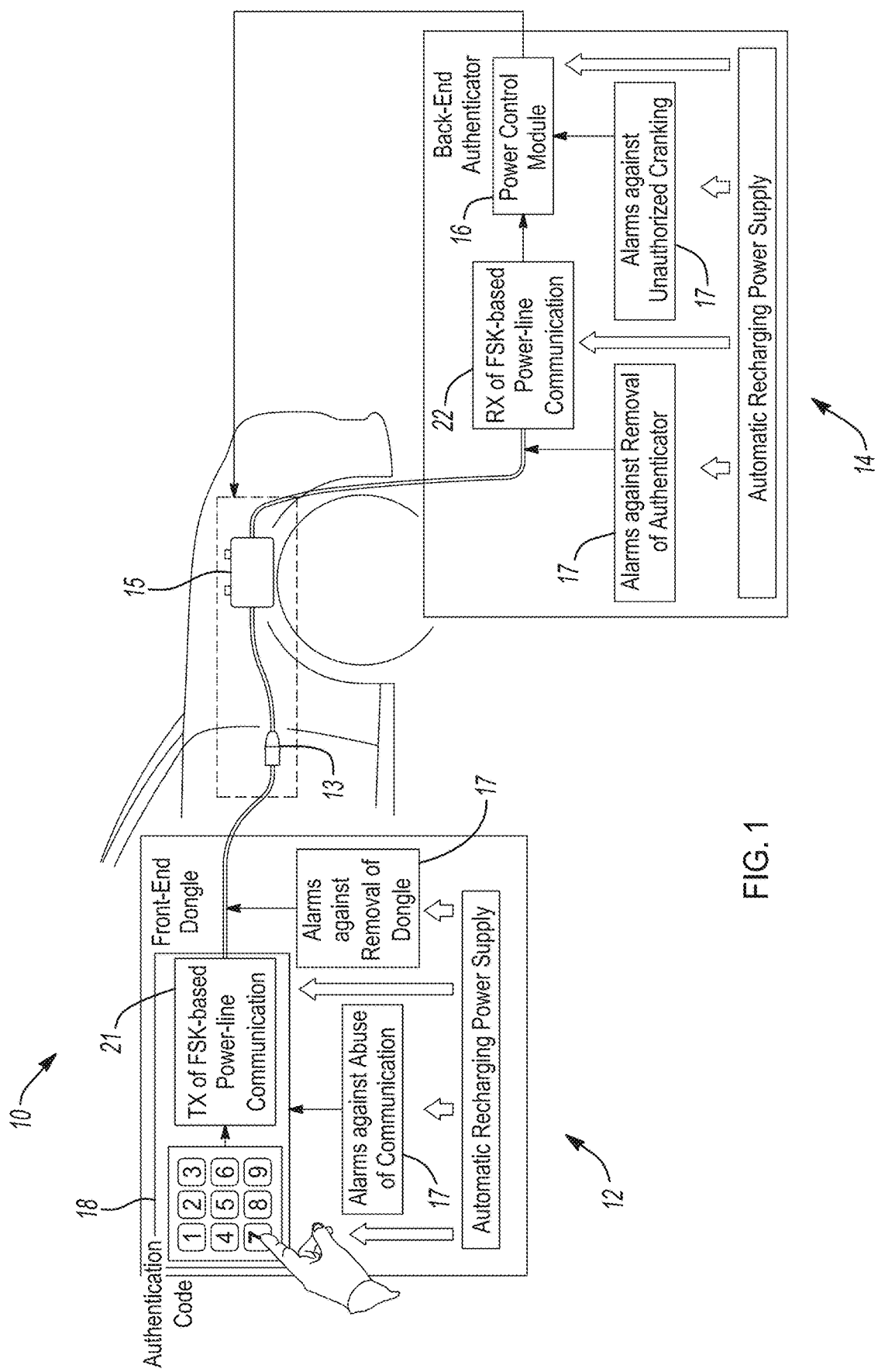
FIG. 1 is a diagram of an example embodiment of the driving authentication system in accordance with this disclosure.

FIG. 1 depicts a driving authentication system 10 for a vehicle. The driving authentication system 10 is comprised of two physical modules: a front-end dongle 12 plugged into the auxiliary power outlet 13, and a back-end authenticator 14 installed in the engine compartment (i.e., adjacent to the battery 15). During operation, the dongle 12 is interfaced with a battery of the vehicle and operates to modulate discharge current from the battery in accordance with an input code. The authenticator 14 is configured to receive a discharge current from the battery 15 and operates to demodulate the input code from the discharge current. The authenticator 14 in turn compares the input code to the one or more known authentication codes and, in response to the input code matching one of the one or more known authentication codes, controls power capacity of the battery. For example, the authenticator 14 connects the battery through a high power circuit path to a vehicle starter module (e.g., an electric starter motor). It is envisioned that the vehicle starter module may take other forms in the content of a hybrid vehicle or an electric vehicle.

Additionally, the driving authentication system 10 may be equipped with alarms to detect, and respond to, illegitimate operations such as (i) attempting unauthorized cranking of the engine, (ii) abuse of the power line communication to drain the battery, (iii) removal of the dongle and/or (iv) removal of the authenticator from the vehicle. In some instances, the driving authentication system 10 may be referred to herein as Bleuth immobilizer system.

The driving authentication system 10 is designed to physically (im)mobilizes the vehicle and does not involve any wireless communication nor requires access to the in-vehicle network. It is important to note that system transmission of authentication information is not observable on the in-vehicle network and because battery current is not monitored or exchanged thereon—thieves cannot trace anything about the authentication even when they can sniff the in-vehicle network constantly. The driving authentication system 10 augments the conventional key-based authentication with the knowledge of drivers themselves, thus serving as a second-factor authentication to protect vehicles against thefts. Lastly, the driving authentication system 10 allows drivers to customize their authentication (code), and can be extended to control entry to vehicles (i.e., by integrating the dongle with door).

In an example embodiment, two rechargeable power supplies are used by the dongle and authenticator, respectively, which recharge automatically with the power generated by the vehicle's alternator, thus freeing drivers from maintenance burden.

For demonstration purposes, the driving authentication system was prototyped and evaluated on eight vehicles as listed in Table 1.

TABLE 1

8 prototyped vehicles.

| Index | Model Year | Vehicle Type | Power Source |
|---|---|---|---|
| V-1 | 2008 | Compact Hatchback | Gasoline |
| V-2 | 2018 | Compact SUV | Gasoline |
| V-3 | 2018 | Compact SUV | Gasoline |
| V-4 | 2017 | Midsize Sedan | Gasoline |
| V-5 | 2019 | Minivan | Gasoline |
| V-6 | 2019 | Pickup Truck | Gasoline |
| V-7 | 2015 | Compact Sedan | Hybrid |
| V-8 | 2016 | Compact Sedan | Electric |

The experimental results shows that the system achieved >99.9% success rate of transmitting the authentication information to the authenticator, (im)mobilize the vehicles without failure, swiftly/reliably detect, and respond to, illegitimate operations, and is robust to the dynamics/noises caused by a vehicle's electric systems and battery aging/voltage/temperature. A user study with (cumulatively) 628 car owners also corroborates the system's utility and commercial potential in the $1.7B market of automotive end-point authentication.

The driving authentication system 10 includes four primary functional components: power line communication (PLC), a power controller, four alarms and two rechargeable power supplies. Each of these components are further described below.

Figure 2:
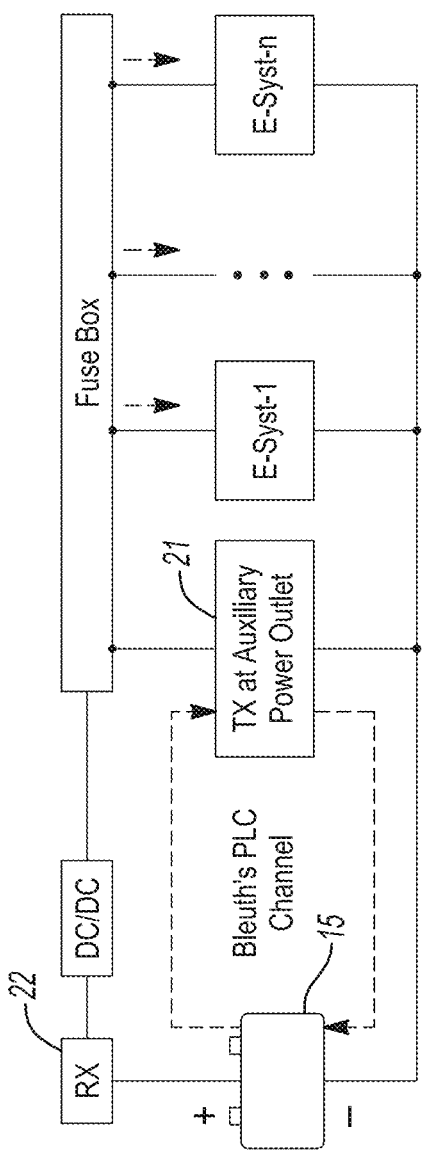
FIG. 2 is a diagram depicting the power line communication (PLC) between the dongle and the authenticator in the driving authentication system.
Figure 3:
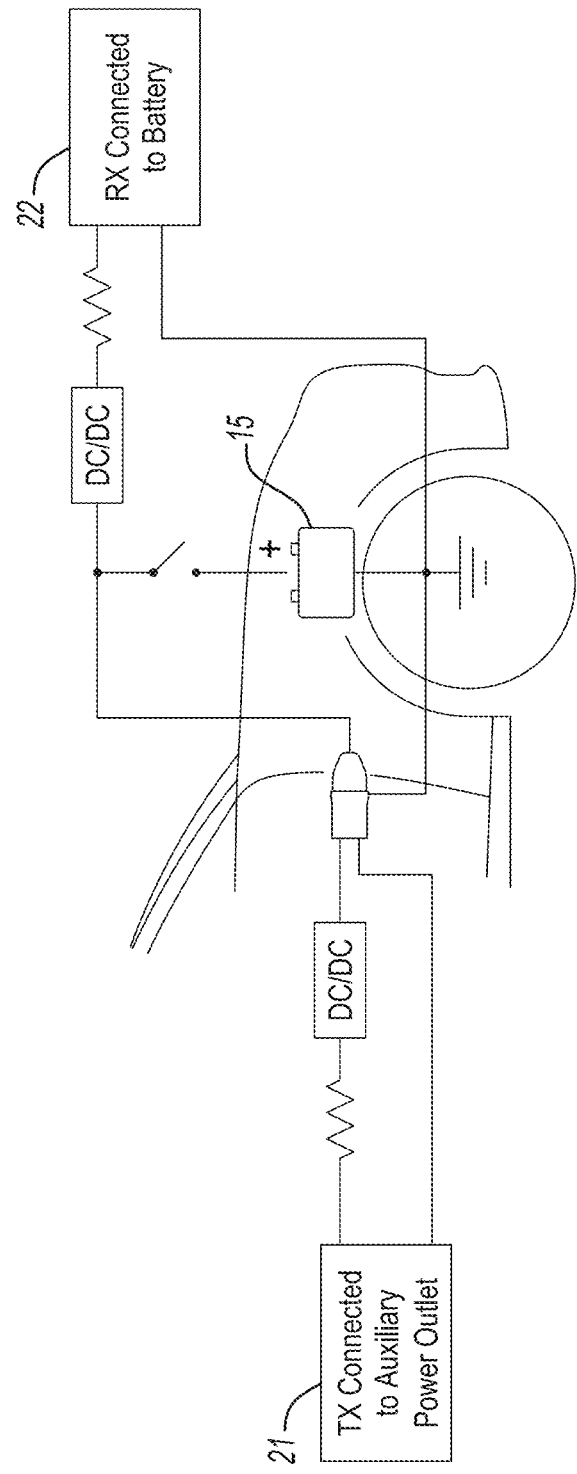
FIG. 3 is a diagram showing how to use off-the-shelf integrated circuits to implement the power line communication.

With reference to FIG. 2, a power line communication channel allows a transmitter circuit 21 to send the driver-inputted authentication code to a receiver circuit 22 using the battery's discharge current as the signal carrier. The dongle/authenticator's heterogeneous location in a vehicle's power network, especially the DC/DC converter in between, make the power line communication between them non-trivial. The power-line channel connecting battery suffers high attenuation, large noise, and low impedance, all of which degrade communication reliability. FIG. 3 shows how to use off-the-shelf integrated circuits (i.e., two MAX20340 PLC modules) to implement the power line communication, where the communication succeeds (fails) when the battery is disconnected (connected) from (to) the circuit. As a rule-of-thumb, one should design the front-end dongle as "thin" as possible.

With continued reference to FIG. 1, a power controller 16 is integrated into the authenticator 14. The controller 16 matches the received driver's input with the pre-defined authentication code and reduces/raises the battery's power capacity to (dis)allow the cranking of engine in the case of (un)successful matching. One or more pre-defined authentication codes may be stored in a data store (i.e., non-transitory storage medium) residing in the authenticator.

Four alarm circuits 17 may be used to detect, and respond to, illegitimate operations in real time. For example, the authenticator detects any unauthorized attempt of cranking of engine and/or its removal (or shorting) from the battery, and the dongle detects the abuse of the power line communication (which drains the battery) and/or its removal from the auxiliary power outlet. Exemplary alarm circuits are described in more detail below.

The driving authentication system 10 may also include a user input device 18 interfaced with the transmitter circuit 21 and configured to receive the input code from a user of the vehicle. In an example embodiment, the user input device 18 is further defined as a keypad. The user input device may include and/or cooperatively work with a bio-fingerprint sensor as well as other types of interfaces for inputting an input code or biometric data. These input devices are merely illustrative and not intended to be limiting.

Figure 4:
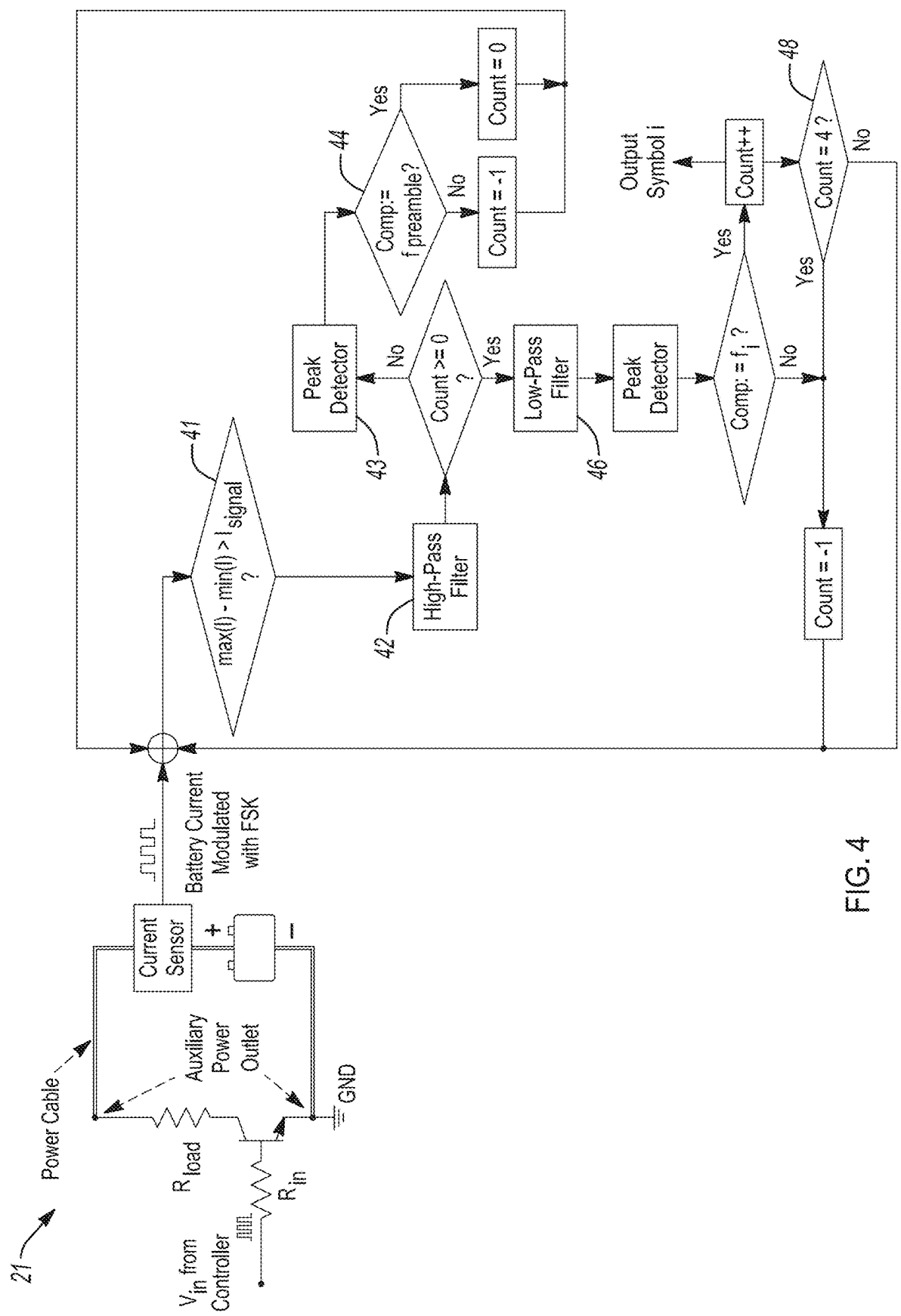
FIG. 4 illustrates the operation of the power line communication between the dongle and the authenticator.

FIG. 4 further depicts the power line communication between the dongle and the authenticator. The dongle and authenticator are connected via the power cable interfacing the auxiliary power outlet (in the driver compartment) and the battery (in the engine compartment), allowing their communication using battery current as the signal carrier. The dongle, as the transmitter, draws modulated current from the auxiliary power outlet (or more specifically, the battery) in response to the driver's input of an authentication symbol. The authenticator (as the receiver) monitors, and demodulates the symbol from the battery's discharge current.

Figure 5:
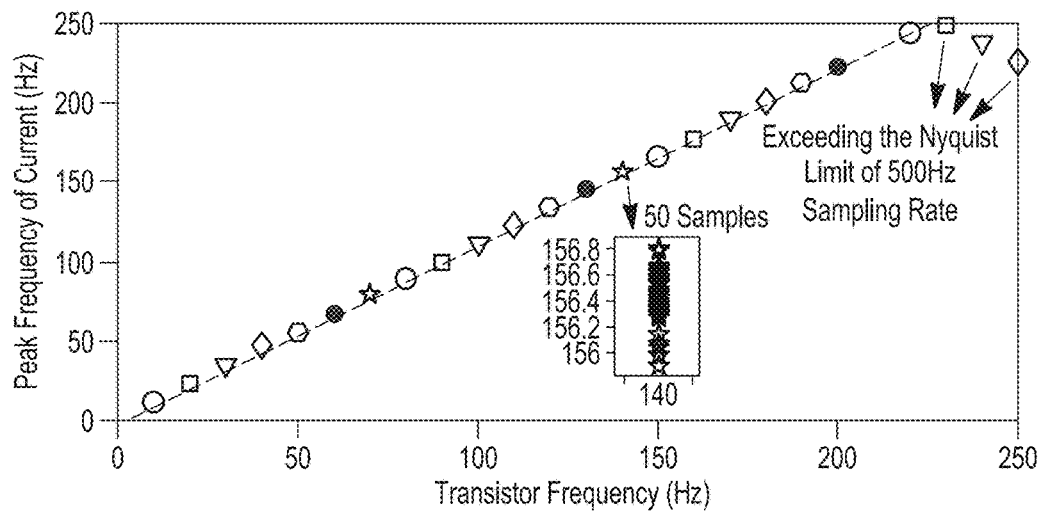
FIG. 5 is a graph showing the linearity between peak frequency of battery current and transistor frequency.

More specifically, an example embodiment of the transmission circuit 21 is shown on the left side of FIG. 4. The transmission circuit 21 controls the connection of a load resistor $R_{load}$ to the auxiliary power outlet using a power transistor. Applying (removing) a control voltage $V_{in}$ to (from) the power transistor will connect (disconnect) $R_{load}$ the power outlet, causing a discharge current of $V_{aux}/R_{load}$ (0 A) atop the vehicle's background current, where $V_{aux}$ is the voltage of the auxiliary power. This embodiment of the transmission circuit 21 allows one to modulate a given driver's input (e.g., a symbol "6") by (de)energizing the transistor at a specific frequency, i.e., using frequency-shift keying (FSK). In the example embodiment, the discharge current is collected at 500 Hz when (de)energizing the transistor at 10-250 Hertz and applied FFT to identify the peak frequency thereof. FIG. 5 summarizes the results, clearly showing their linearity, i.e.

$$f_{peak} = a \cdot f_{transistor} + b (a > 1) \tag{1}$$

as well as the consistency of $f_{peak}$ when operating the transistor at a fixed frequency, corroborating the feasibility of this FSK-based modulation. FIG. 5 shows that operating the transistor at a high frequency (e.g., ≥230 Hz) is not reliable enough to implement FSK, because a≈1.12 in Eq. (1)—a>230 Hz transistor frequency leads to >250 Hz peak frequency of current, exceeding the Nyquist limit when sampling at 500 Hz.

Figure 6:
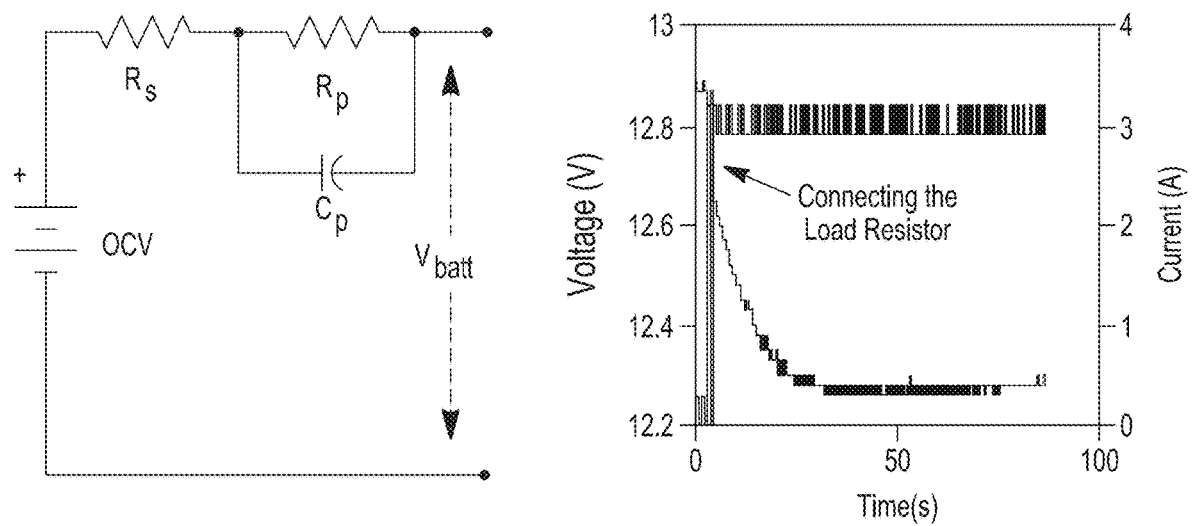
FIG. 6 shows that battery current responds to load stimulus faster than battery voltage.
Figure 7A:
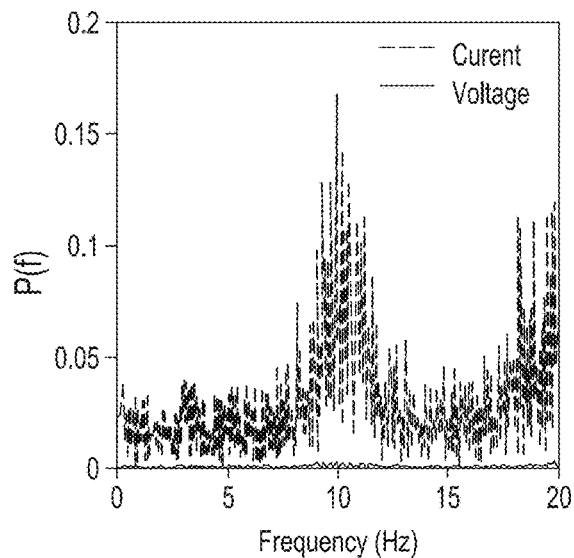
FIGS. 7A and 7B are graphs showing that the battery current is a more reliable signal carrier than battery voltage.
Figure 7B:
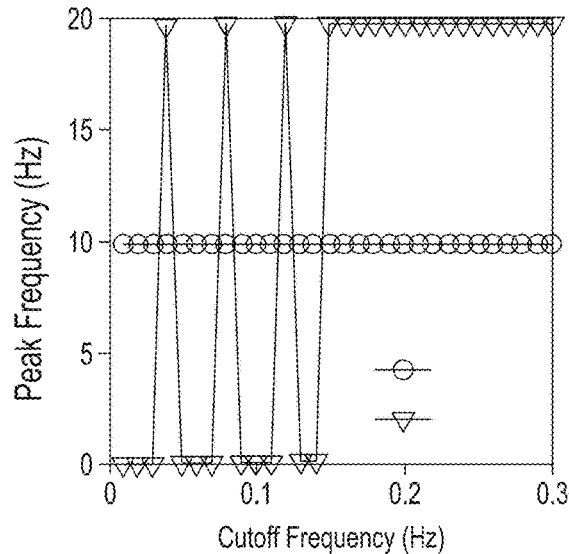

Battery voltage may be used as an alternative signal carrier for power line communication. Current is preferably chosen because battery voltage responds slower than current, to load stimulus because of its capacitive behavior, i.e., $$V_{batt}(t) = OCV - (R_s + R_p) \cdot I + R_p \cdot C_p \cdot \frac{dV_{batt}(t)}{dt},$$

where $\{R_S, R_p, C_p\}$ are the battery's equivalent serial resistance, parallel resistance, and capacitance, respectively (see FIG. 6). The time constant $\tau = R_p \cdot C_p$ describes how quickly the battery voltage stabilizes—ideally, battery voltage supports a maximum signal frequency of $1/\tau$ as a higher frequency would prevent the voltage from stabilizing and thus increasing signal variance. Note that battery voltage also suffers from the dynamics caused by the battery's State-of-Charge (SoC), temperature, and age. FIG. 7A plots the results after applying FFT to the current/voltage collected (and then filtered with a 0.01 Hz high-pass filter) when operating the transistor at 10 Hz: one can clearly observe the 10 Hz operating frequency from the current, but not from the voltage. FIG. 7B further plots the peak frequency identified from the current/voltage when the cutoff frequency of the high-pass filter is varied, corroborating again that current is a more reliable signal carrier than battery voltage.

A current signal with a larger amplitude—i.e., using a smaller $R_{load}$—improves the robustness of communication but increases power consumption. This trade-off is optimized based on conjecture that the amplitude of the current signal should be larger than that of the channel variance/noises, i.e., the fluctuating magnitude of a vehicle's idle current $I_{idle}$:

$$I_{signal} = V_{aux}/R_{load} > \max(I_{idle}) - \min(I_{idle}) \qquad (3)$$

Figure 8A:
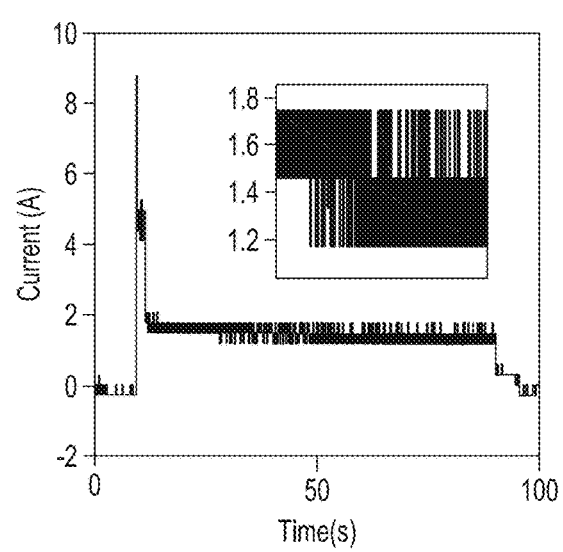
FIG. 8A is a graph showing the variance of a vehicle's idle current.
Figure 8B:
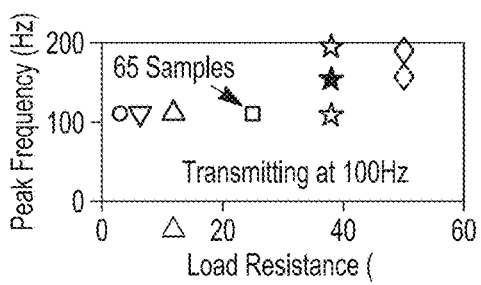
FIGS. 8B and 8C are graphs showing the peak frequency demodulated from the current signal transmitting at 100 Hz and 180 Hz, respectively.
Figure 8C:
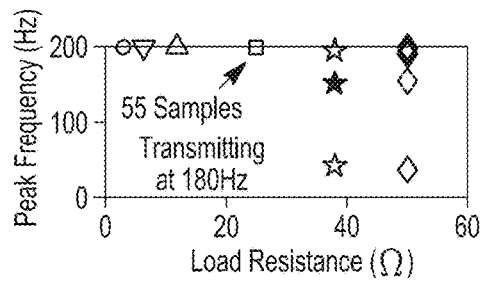

Consider the idle current of V−1 plotted in FIG. 8A, which has a ≈0.6 A fluctuating magnitude. Equation (3) implies an $R_{load} < 12V/0.6 A = 20\Omega$ is needed to ensure the communication reliability (assuming a standard $V_{aux}$ of 12V). To validate this, transmit signals modulated at 100 Hz and 180 Hz using load resistors with various resistances while keeping the vehicle idle and $V_{aux} \approx 12.2V$. FIGS. 8B and 8C summarizes the peak frequency demodulated from the current signal transmitting at 100 Hz and 180 Hz, respectively, showing a resistor of $\{3, 6, 12, 25\}\Omega$—leading to a $I_s I_{signal}^{signal}$ of $\{4.07, 2.03, 1.02, 0.49\}$A—achieves accurate demodulation, while those with larger resistances (i.e., 38Ω and 50Ω) cannot due to too small a current (i.e., 0.32 A and 0.24 A), corroborating Eq. (3) except for the case of $R_{load} = 25\Omega$. Below it is shown that an $R_{load}$ of 25Ω, albeit leading to 100% demodulation accuracy, causes miss detection of the transmitted signal. While exemplary embodiments have been described above with specific components having specific values and arranged in a specific configuration, it will be appreciated that the driving authentication system 10 may be constructed with many different configurations, components, and/or values as necessary or desired for a particular application. The above configurations, components and values are presented only to describe one particular embodiment that has proven effective and should be viewed as illustrating, rather than limiting, the present invention.

Figure 9:
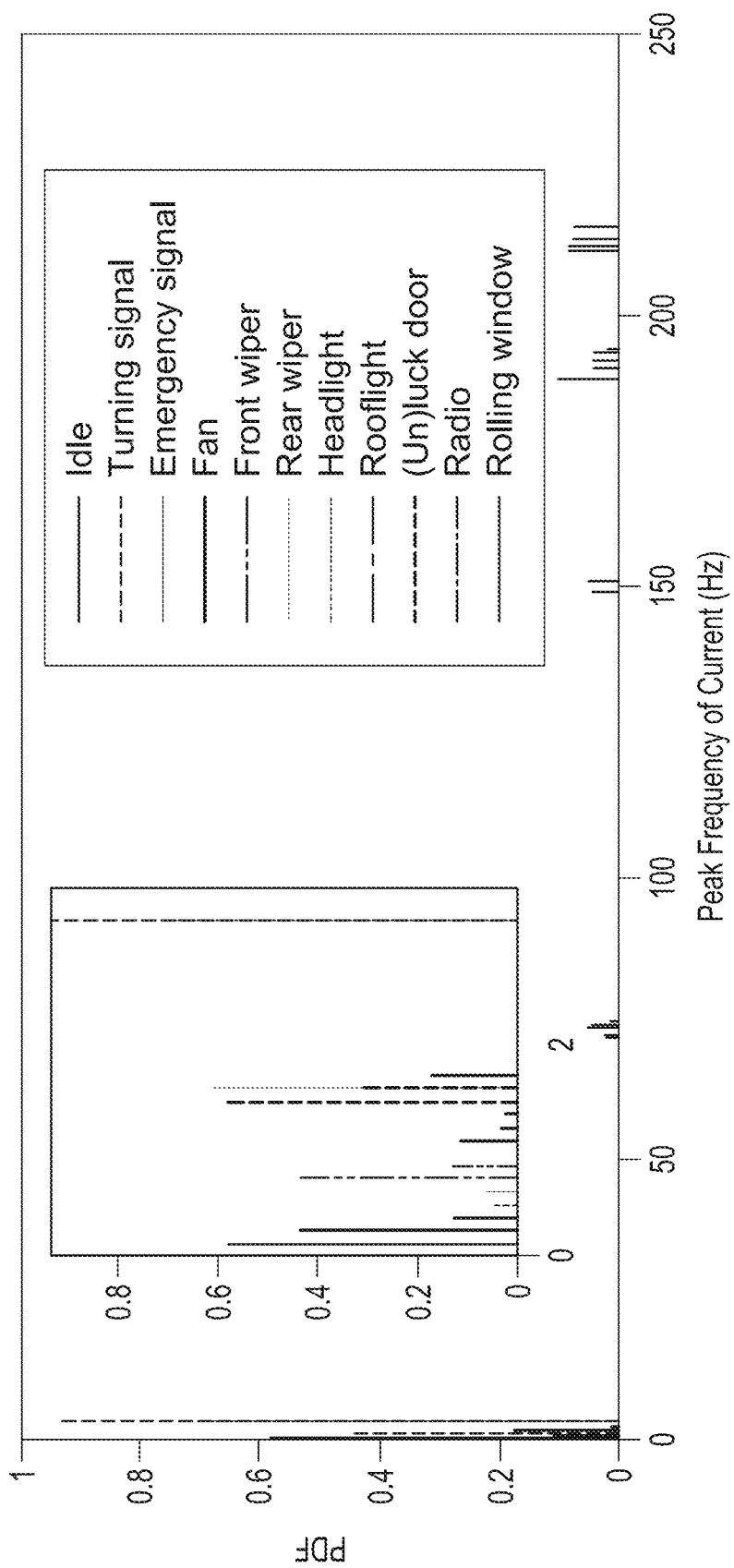
FIG. 9 is a graph showing peak frequency of discharge current when operating the e-system of the prototype vehicle.
Figure 10A:
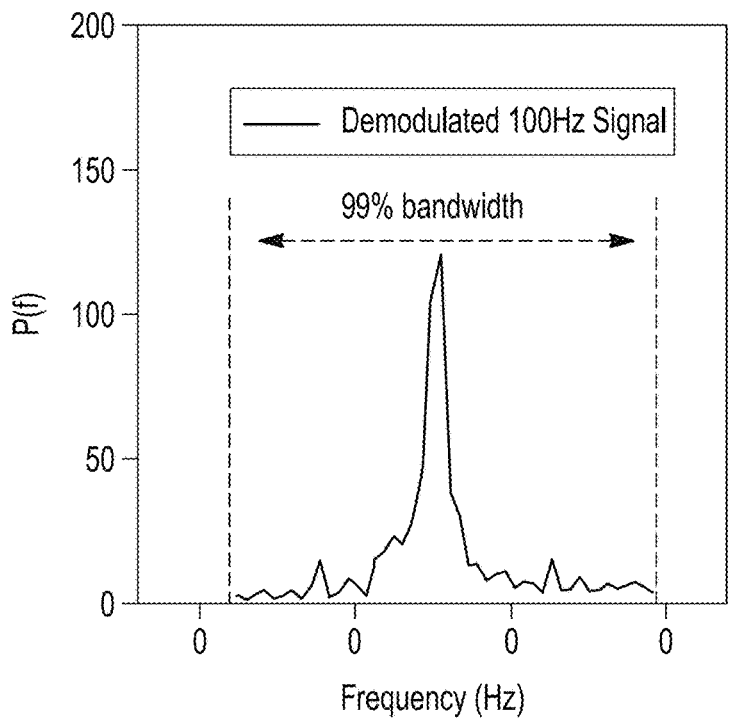
FIGS. 10A and 10B are plots shows that the modulated current signal has a maximum 99% bandwidth of 3.08 Hz.
Figure 10B:
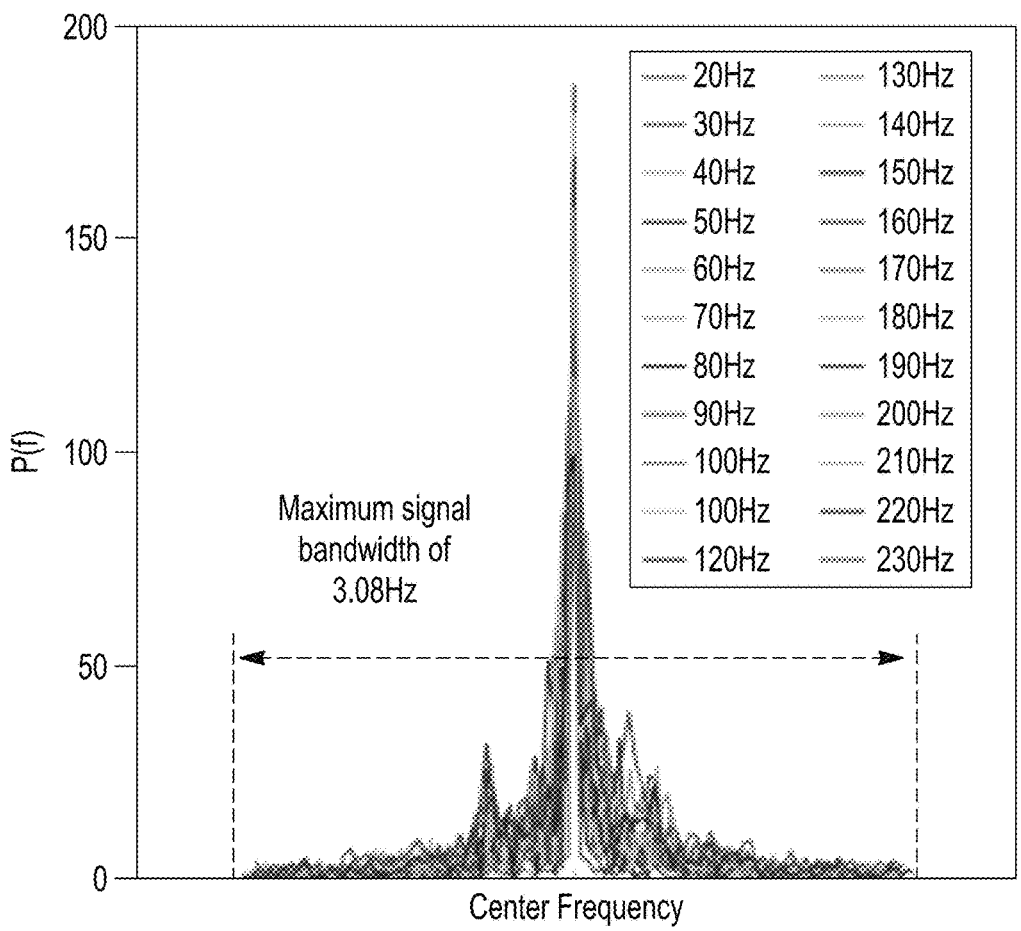

Unlike the traditional FSK, this disclosure proposes using a set of pre-defined transistor frequencies $F = \{f_0, f_1, f_2, \ldots, f_9\}$ to modulate directly the driver's input of symbols $\{$"0", "1", "2", \ldots, "9"$\}$. This direct modulation is allowed by the fixed/limited authentication symbols and the relatively sufficient frequency spectrum (e.g., 10-220 Hz as shown in FIG. 5). F should be selected to avoid the inter-symbol interference, as well as the interference with the vehicle's electric systems—the e-system operation affects significantly the power-line channel, and hence the communication thereover. FIGS. 10A and 10B plot the 99% bandwidth of the signal modulated at 20-230 Hz, showing the system's need for an inter-symbol frequency of >3.08 Hz to avoid interference. Also, at least 64 samples are needed to ensure the demodulation accuracy, which leads to a frequency resolution of 7.8 Hz when sampling at 500 Hz. Finally, the peak frequency of the current is examined when operating the e-systems of V−1, as plotted in FIG. 9.

Unsurprisingly, the e-system frequency is clustered at the low end of the spectrum, which the system should avoid. Based on these observations, symbols "0"-"9" are modulated using $F = \{40:10:130\}$ Hz in an example embodiment. Note these low frequencies of F will not interfere with other vehicle systems operating in pre-allocated frequency bands, e.g., 87.5-108 MHz for FM radio. It is readily understood that the symbols can be modulated using other frequencies as well.

The driving authentication system's power-line communication is needed only when the driver keys in his/her authentication code, which happens at irregular time intervals and thus prefers an asynchronous communication protocol. To ensure the detection of the asynchronous transmission at the authenticator/receiver, a preamble is preferably appended before transmitting the authentication symbols, which is modulated at a high frequency of $f_{preamble} = 180$ Hz that is rarely observed when operating a vehicle's e-systems.

Finally, the transmission duration is determined, i.e., the time to send the preamble (at frequency $f_{preamble}$) and a given authentication symbol (at frequency fi∈F), as illustrated in FIG. 11. In one embodiment, a symbol duration of $T_s = \theta \cdot T_w (\theta > 1)$ is used, where TW is the size of the moving window which the receiver at the authenticator uses to demodulate the current signal, and θ>1 is a transmission coefficient used to ensure demodulation accuracy.

Returning to FIG. 4, the receiver circuit at the authenticator demodulates the transmitted authentication symbol from battery current using a moving window of size Tw. For a given window, the receiver first checks if the fluctuation of current thereof is larger than $I_{signal}$ (i.e., it will otherwise not contain the transmitted signal) at 41, in which case the receiver applies a 5 Hz high-pass filter (steered by FIG. 9) at 42 to remove the noises caused by e-operations, and then identifies the peak frequency of the remaining signal (denoted as $f_{peak}$) at 43 using FFT. The receiver concludes the detection of the preamble if $|f_{peak} - a \cdot f_{preamble} - b| \leq f\delta$ at 44, after which the receiver will attempt to identify the transmitted authentication symbols in the next window(s) by applying a low-pass filter at $f_{preamble}$ at 46 and checking if $|f_{peak} - a \cdot fi - b| \leq f\delta$ for certain symbol i. This process continues until a total of four symbols have been received as indicated at 48, in which case the system validates the driver's identity by matching the received symbols with the pre-defined authentication code.

Figure 13:
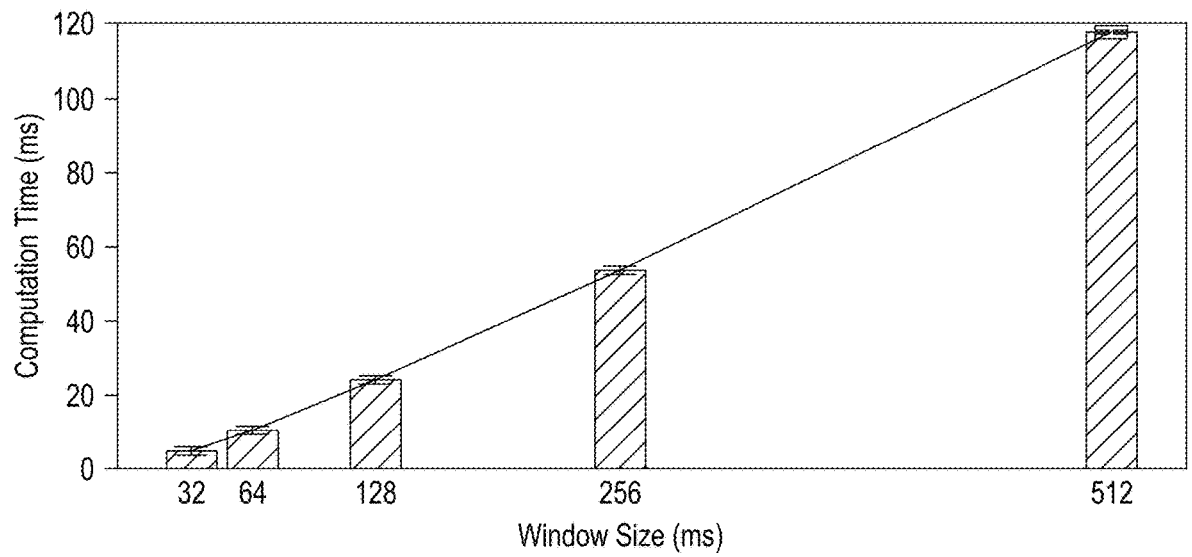
FIG. 13 is a graph showing the computation time to process windows of different sizes.

Next, the signal threshold fδ, the window size Tw, and the transmission coefficient θ are examined. fδ must be determined jointly with window size Tw; a smaller Tw increases the variance of detected peak frequency and thus requires a larger fδ to ensure demodulation accuracy (see FIG. 12 which plots the demodulation of a 100 Hz signal with different-size windows). Note that the choices of window size to the power of 2 in FIG. 13 is limited to facilitate the implementation of FFT on the authenticator's micro-controller (MCU). $T_w$ is desired to be small to allow a high data rate, but needs to be large enough to collect sufficient signal samples for accurate demodulation, e.g., at least 128 ms to collect 64 signal samples at 500 Hz in FIG. 12. A conservative setting of $T_w = 256$ ms is used in the example embodiment to ensure communication reliability, which, in turn, implies fδ of 1 Hz according to FIG. 12. θ is also desired to be small, but must be sufficiently large to ensure that for any preamble/symbol transmission, there must be a window at the receiver capturing at least 64 signal samples. Taking FIG. 11 as an example, where the transmitting signal for a preamble/symbol is collected in two consecutive windows at the receiver—for any transmission j, one needs to ensure at least one of $\{x_j, y_j\}$ is larger than 64/500 Hz=128 ms (or $T_w/2$). Letting $T_p$ be the computation time for the receiver to process a collected window, the objective is to:

minimize θ s.t. $\forall j, \max\{x_j, y_j\} \geq T_w/2$, $\forall j, x_j + y_j = \theta \cdot T_w - T_p$, which leads to the requirement of $$\theta \geq (T_w + T_p)/T_w \quad (5)$$

FIG. 13 plots the computation time when using Arduino Mega as the authenticator's MCU to process different-size windows, showing a (slightly) super-linear relationship between $T_w$ and $T_p$ (i.e., FFT has $\mathcal{O}(n \log n)$ complexity). One can approximate this relationship with linear regression and obtain Tp≈0:23Tw, i.e., θ≥1.23. Note that although these empirical settings are determined for the hardware used to prototype the system, the approach identify them is general.

To reduce its power consumption, the driving authentication system 10 is designed to activate its power line communication only when a driver needs to be authenticated, which is determined based on the event of turning on the vehicle. Specifically, the dongle concludes the turning-on of the vehicle when Vaux≈12V is observed—the auxiliary power outlet will be disconnected from the battery and thus Vaux=0V is observed. Otherwise, the authenticator concludes the turning-on of the vehicle when the battery's discharge current increases from ≈0 A to a few amperes, as a result of the activation of the vehicle's e-system. The system deactivates the communication when the engine is cranked successfully (which is possible only after passing the authentication), observed by the dongle/authenticator as Vaux≈15V and a charging battery, respectively.

Figure 14:
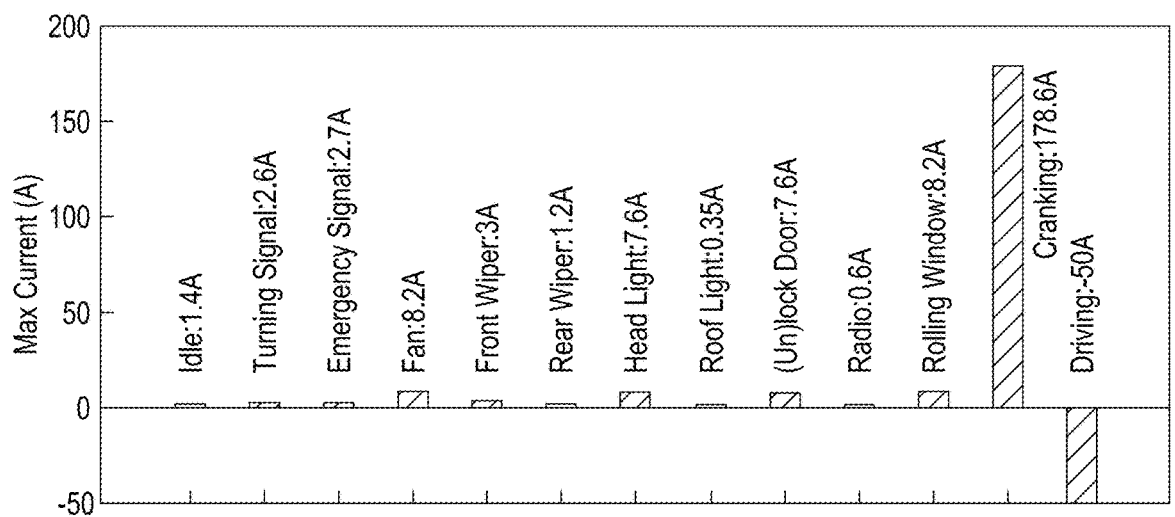
FIG. 14 shows the battery current when operating the e-systems of the prototype vehicle.

The authenticator matches the received driver's input with his/her pre-defined authentication code, and (im)mobilizes the vehicle by controlling the battery's power capacity based on the (mis)matched results. This power control builds on the fact that cranking the engine requires a much larger current than a vehicle's e-systems (including the power line communication for authentication), e.g., cranking the engine requires 2-9 kW for 0.3-3 s depending on vehicle type. FIG. 14 summarizes measurements of the battery's discharge current when operating the e-systems of V-1, and compares them with that for cranking the engine-cranking the engine requires a >3× current of that for operating all other e-systems together. This fact encompasses a current level that supports the PLC-based driver authentication but not cranking the engine, allowing one to use the battery's power capacity as the control knob to enable the cranking of engine based on the authentication results.

Figure 15:
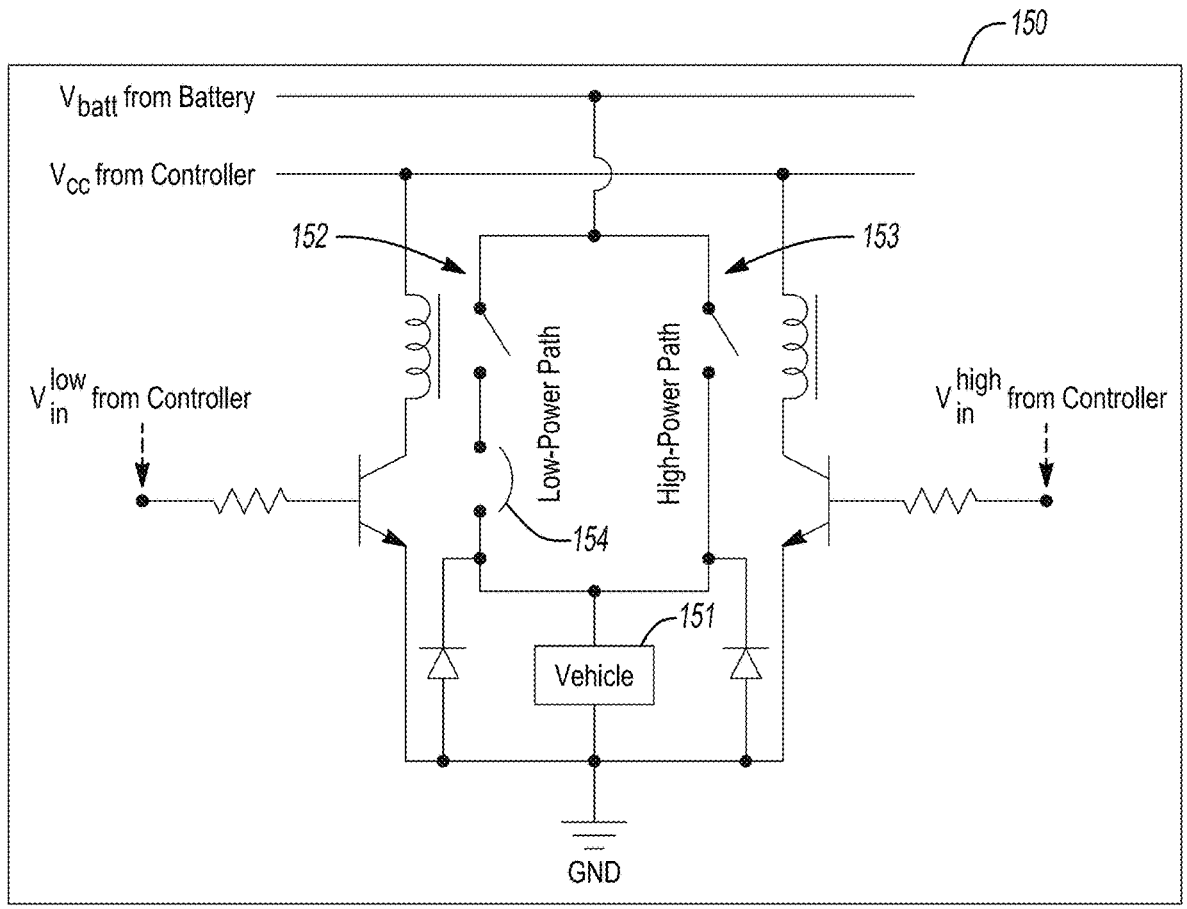
FIG. 15 is a schematic for an example embodiment of a power control module.

FIG. 15 illustrates an example embodiment of a switching circuit 150 interfaced with the power controller 16 (not shown). This design eliminates power distributor thereof and provides protection against voltage surge. The controller connects the battery and a vehicle starter module 151 with two (i.e., low and high) power paths 152, 153 and each path uses a relay to control its connection (i.e., by applying/removing $V_{in}^{low}$ and/or $V_{in}^{high}$) The low-power path 152 further uses a circuit breaker 154 to limit the maximum current allowed thereof (i.e., $I_{low}^{max}$), exceeding which will disconnect the breaker (and hence the path) although other current limiting components are contemplated by this disclosure. Note that a circuit breaker can be reset (e.g., by pressing a button) without replacing any physical component.

In this example, the system connects the low-power path by default to allow only a current up to $I_{low}^{max}$, where $\Sigma I_i < I_{low}^{max} < I_{crank}$ and $I_i$ is the current needed to operate the i-th e-system of the vehicle. In the case of successfully validating a driver's identity, the driving authentication system disconnects (connects) the low (high) power path to restore the maximum current that can be drawn from the battery, thus enabling the cranking of engine. Also, a reverse surge voltage may be generated when switching the path connectivity, reducing the power controller's lifetime. In this example, two protective diodes sized at 10× the battery voltage are used to protect the circuit from a voltage surge.

In the example embodiment, the driving authentication system 10 uses four alarm circuits to detect, and respond to illegitimate operations: (i) attempts of unauthorized cranking of the engine, (ii) removal of the authenticator from the battery/vehicle, (iii) abuse of the power line communication using the dongle to drain the battery, and (iv) removal of the dongle from the auxiliary power outlet. With reference to FIGS. 16A-16D, these alarms are designed in the form of low-cost/complexity electrical circuits to ensure reliable/swift detection/response. Note that the system can respond to illegitimate operations in other forms, e.g., sending an alarm message to car owners' mobile devices, using the same circuit logic presented below.

The battery and the vehicle are connected by the low-power path before the driver successfully authenticates him/herself—cranking the engine without passing the authentication (e.g., unauthorized cranking) overloads/breaks the low-power path. Driven by this fact, the driving authentication system uses the alarm circuit shown in FIG. 16A—consisting of a protective resistor R1 and a siren connected in parallel with the low/high power paths—to detect, and respond to automatically, unauthorized cranking. The alarm path will be shorted, and thus the siren thereof deactivated, when either the low or high power path is connected. On the other hand, unauthorized cranking will disconnect both paths and activate the alarm. The protective resistor R1 needs to be sized according to $$I_{siren}^{min} \leq \frac{V_{batt}}{R_1} \leq I_{siren}^{max},$$

where $I_{siren}^{min}$ and $I_{siren}^{max}$ are the min/maximum current to operate the siren safely.

Figure 16A:
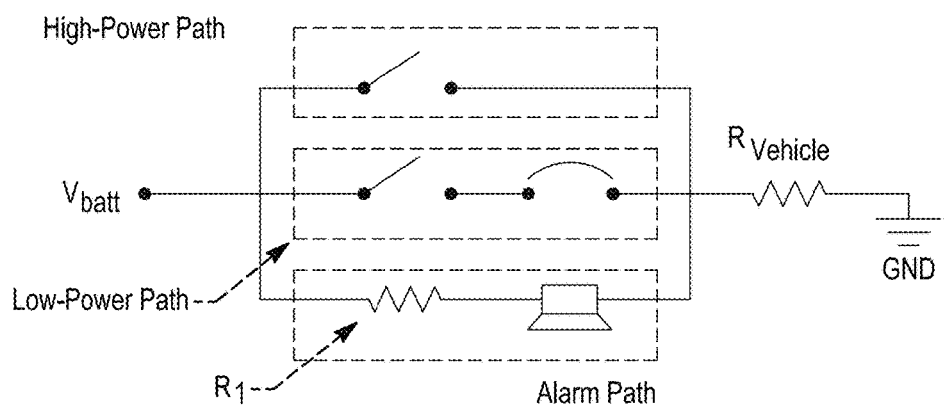
FIGS. 16A-16D are schematics for four example alarm circuits which can be incorporated into the driving authentication system.
Figure 16B:
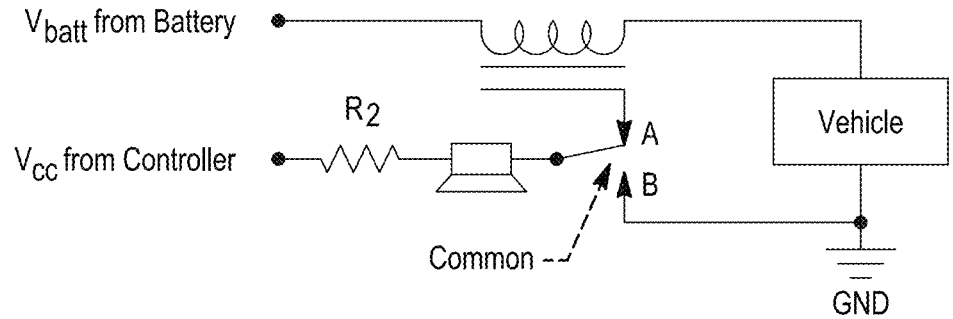
Figure 16C:
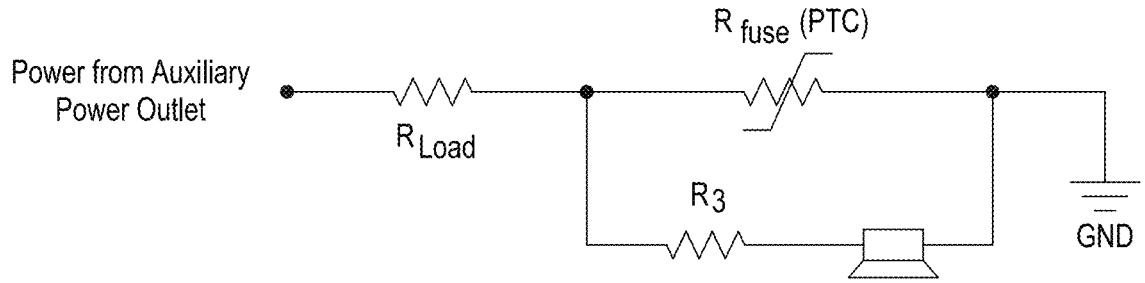
Figure 16D:
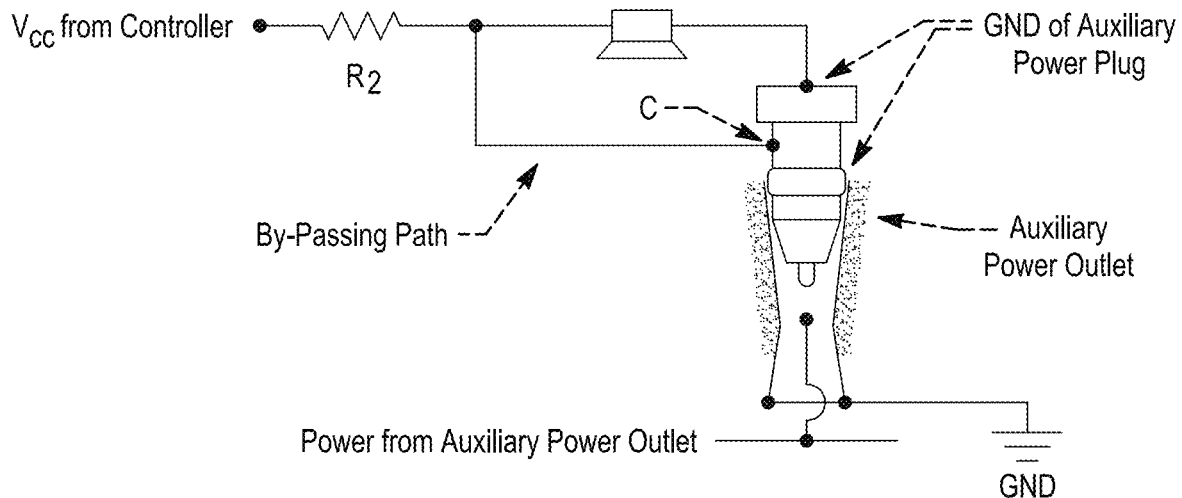

Security-by-obscurity is known to be not secure. Thieves who are aware of the system may attempt to disable its anti-theft protection by uninstalling the authenticator from the battery/vehicle. In the example embodiment, the system uses a relay (e.g., Single Pole Double Throw relay) to detect, and respond to, such illegitimate removal of authenticator, as depicted in FIG. 16B. Specifically, the coil of the relay will be energized when the connections among the battery, the authenticator, and the vehicle are intact, and thus the relay's common terminal will be connected with terminal A, leaving the alarm path disconnected. On the other hand, removing the authenticator will disconnect it from the battery/vehicle and de-energize the coil—the relay's common terminal will connect to terminal B and thus close the alarm path to activate the siren. This alarm circuit also detects the attempts to by-pass the authenticator by connecting the battery and vehicle directly with additional wires, which shorts/de-energizes the coil and activates the siren.

Figure 17:
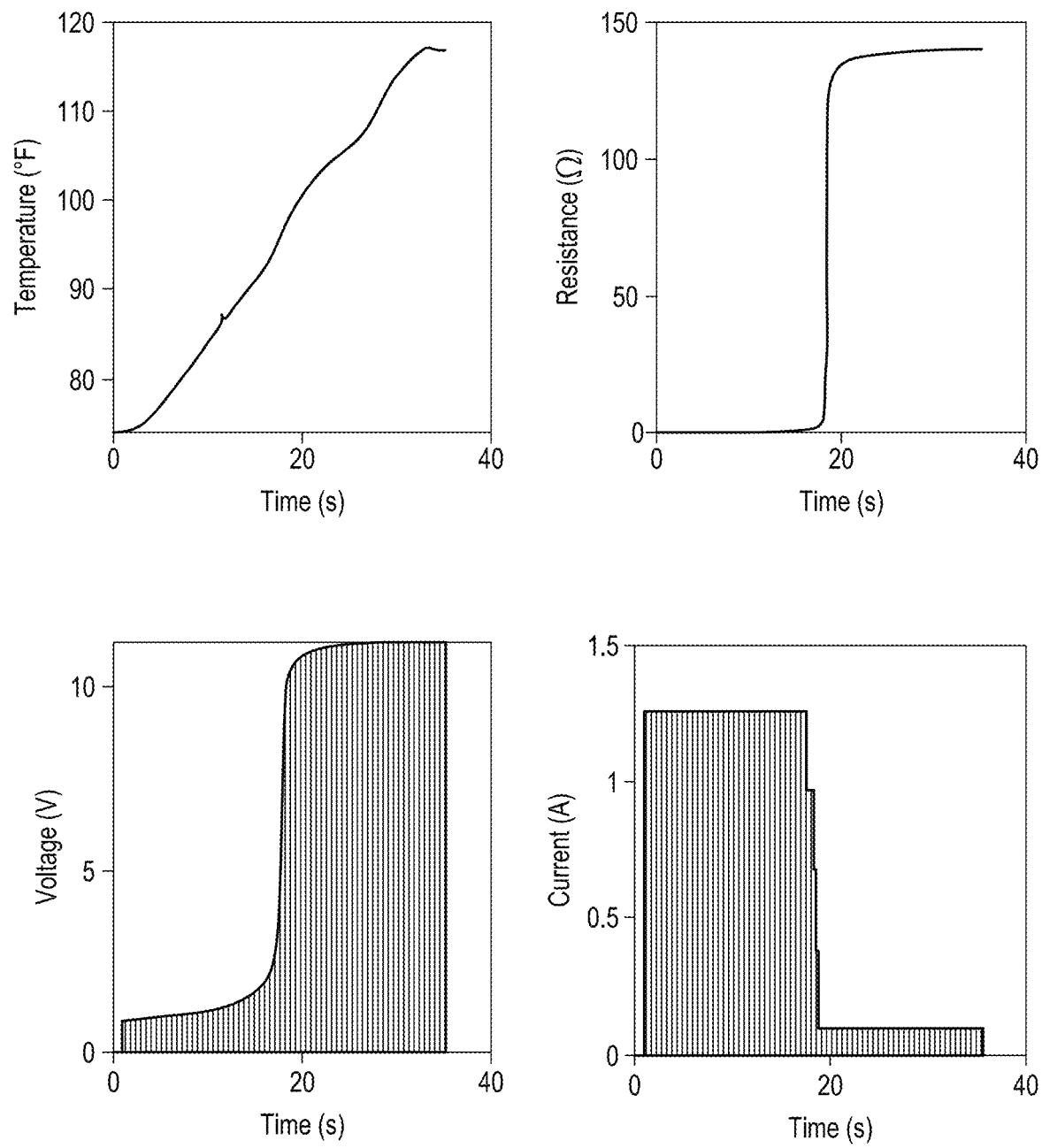
FIG. 17 shows that heating the PTC fuse can disable the transmitter.

Thieves who have broken into the driver compartment and activated the auxiliary power outlet—e.g., using stolen/ cloned keys—may abuse the power line communication by using the dongle to transmit consistently, thus draining the vehicle battery and mounting a deny-of-service (DoS) attack. The system prevents this using the fact that the transmission causes discharging and thus heating. In an example embodiment, the system uses the circuit in FIG. 16C to disable automatically the dongle's transmission, as well as trigger an alarm siren, when the resettable PTC (i.e., Positive Temperature Coefficient) fuse heats too much due to the transmission current. The resistance of the PTC fuse increases as a result of heating, which eventually reduces the current to a very small value, and thus disables the transmission to prevent excessive battery drain. Note that $R_{fuse}$ decreases, and the conductivity of this transmitting path resets automatically, when the fuse cools down. Clearly, one can change the sensitivity of this alarm circuit by using a PTC fuse with a smaller or larger rating of hold current. FIG. 17 plots measurements after integrating the alarm circuit in FIG. 16C with the system's dongle and then transmitting constantly a symbol modulated at 100 Hz until the PTC fuse is (almost) disconnected, corroborating the ability of the alarm circuit in disabling automatically the dongle's transmission and thus preventing the DoS attack. Also, the driving authentication system 10 uses an alarm path—which is in parallel with the PTC fuse—to respond to this abuse of communication. The siren of the alarm path will be triggered when the voltage across the fuse (i.e., $V_{fuse}$) is large enough (as a result of increased resistance, see FIG. 17) to reach a current larger than $I_{siren}^{min}$.

Thieves who gained access to the driver compartment may attempt to remove the dongle from the auxiliary power outlet, trying to mount another DoS attack. In the example embodiment, the driving authentication system 10 uses the alarm circuit shown in FIG. 16D to detect such illegitimate dongle removal. Specifically, the driving authentication system adds an additional terminal C to the traditional auxiliary power plug, which will be in contact with the GND of the auxiliary power outlet when the dongle is properly installed—the bypassing path will be connected, thus shorting the alarm path and deactivating the siren. In case of unplugging the dongle from the auxiliary power port, the bypassing path will be disconnected, thus activating the alarm path/siren. This alarm also reduces the mental stress of drivers in keeping the dongle installed on the car and hence need not carry it all the time.

Figure 18A:
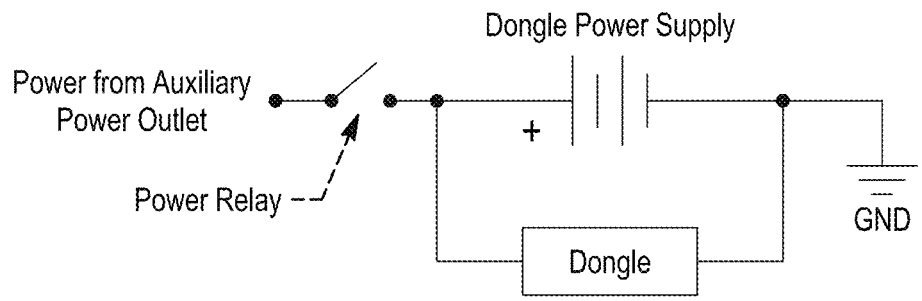
FIGS. 18A and 18B are schematics for rechargeable power supply circuits for the dongle and the authenticator, respectively.
Figure 18B:
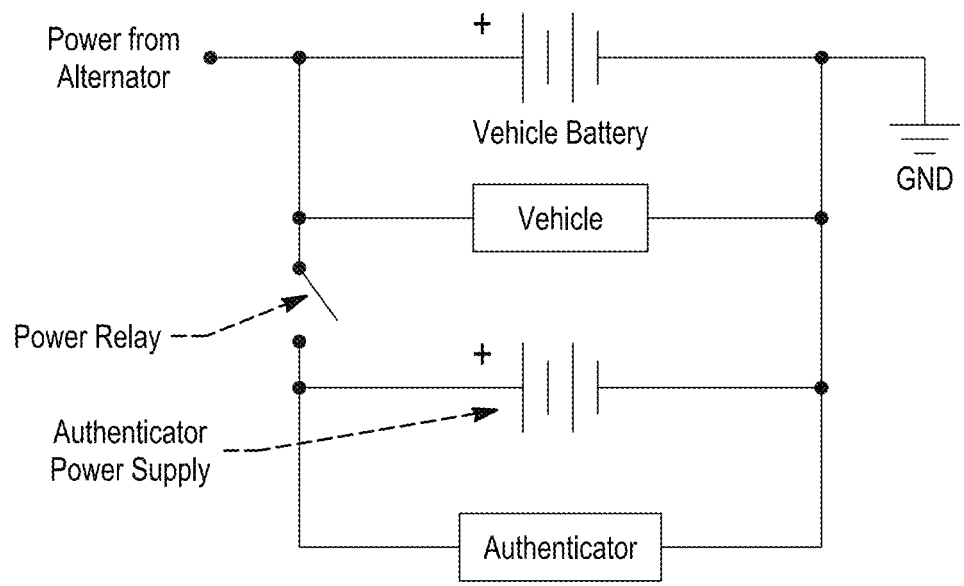

To ensure a 24/7 operation, both the dongle and authenticator are equipped with a rechargeable power supply, which not only relieves drivers from maintenance burden, but also eliminates the noises to the power line communication caused by the power consumption of dongle/authenticator. FIGS. 18A and 18B depict example rechargeable power supply circuits for the dongle and authenticator, respectively. These power supplies operate in two states: disconnecting or connecting the power relay when the engine is stopped or running, respectively. The dongle determines a stopped (or running) engine when observing Vaux<13V (or Vaux≈15V); the authenticator concludes the same based on whether the battery is charging (i.e., a running engine) or not (i.e., a stopped engine).

Figure 19A:
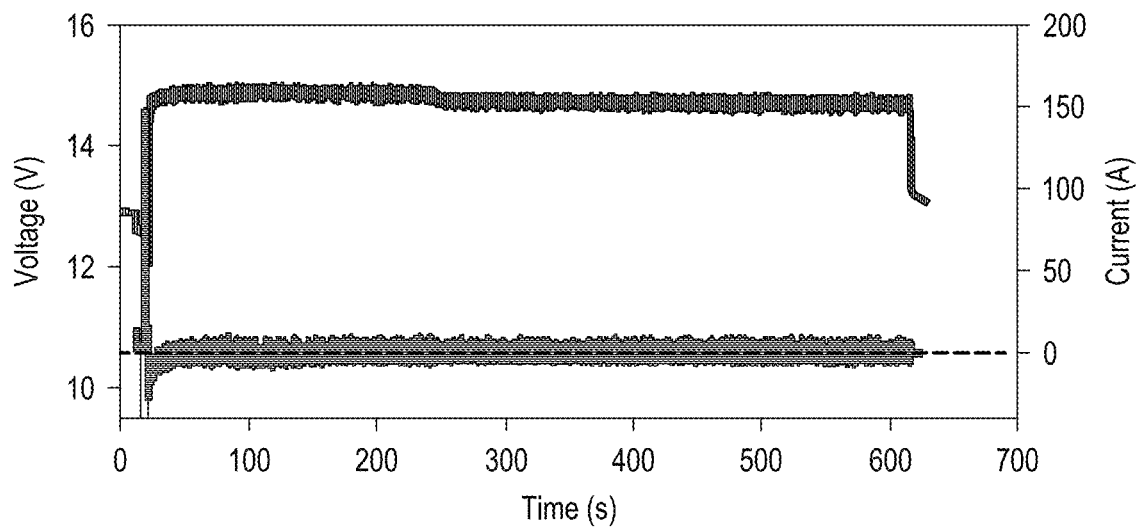
FIGS. 19A and 19B are graphs showing that an alternator's power generation capacity is not fully used.
Figure 19B:
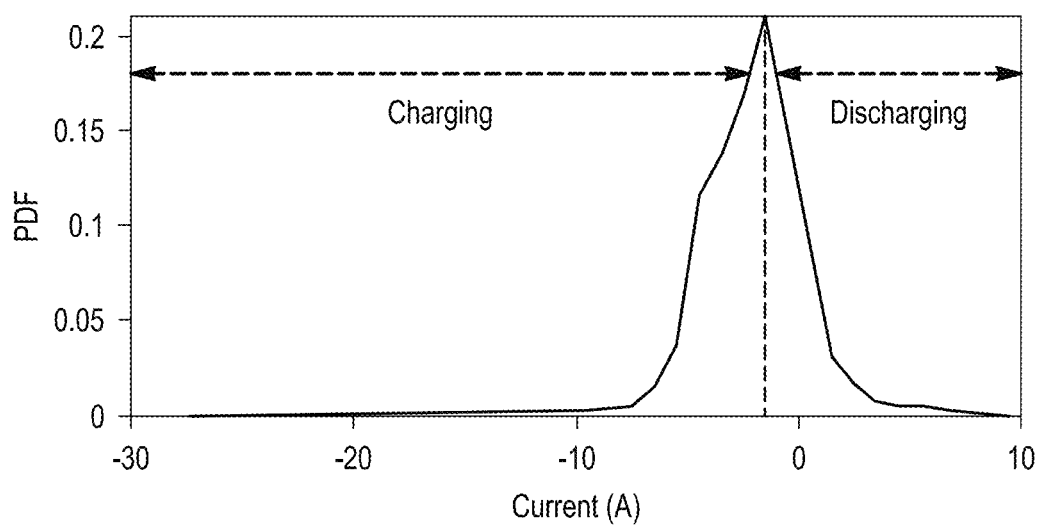

The charge of the system's power supplies reduces the power to charge the vehicle battery, which may prevent the vehicle battery from being sufficiently charged to crank the engine. To study this issue, the battery current was collected when driving V-1, as plotted in FIGS. 19A and 19B. Clearly, the battery is not always charging during driving, because the battery voltage may reach the maximum level in which case the charging must be stopped for safety. This shows that the alternator's power generation is not fully used on commodity vehicles, corroborating the availability of power to charge the driving authentication system without risking sufficient charging of vehicle battery.

Figure 20A:
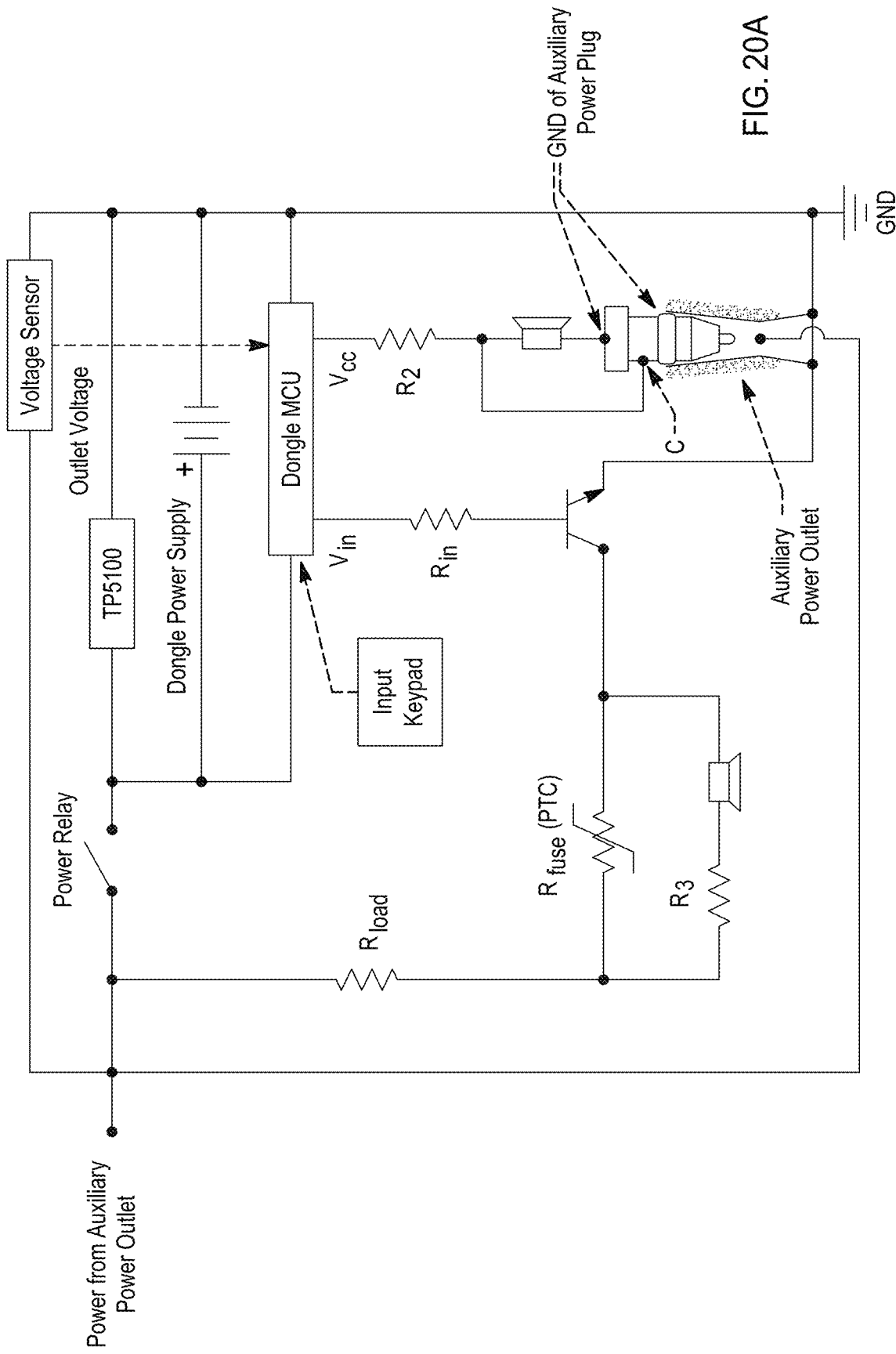
FIGS. 20A and 20B are schematics for the dongle and the authenticator, respectively, with the rechargeable power supply circuits integrated therein.
Figure 20B:
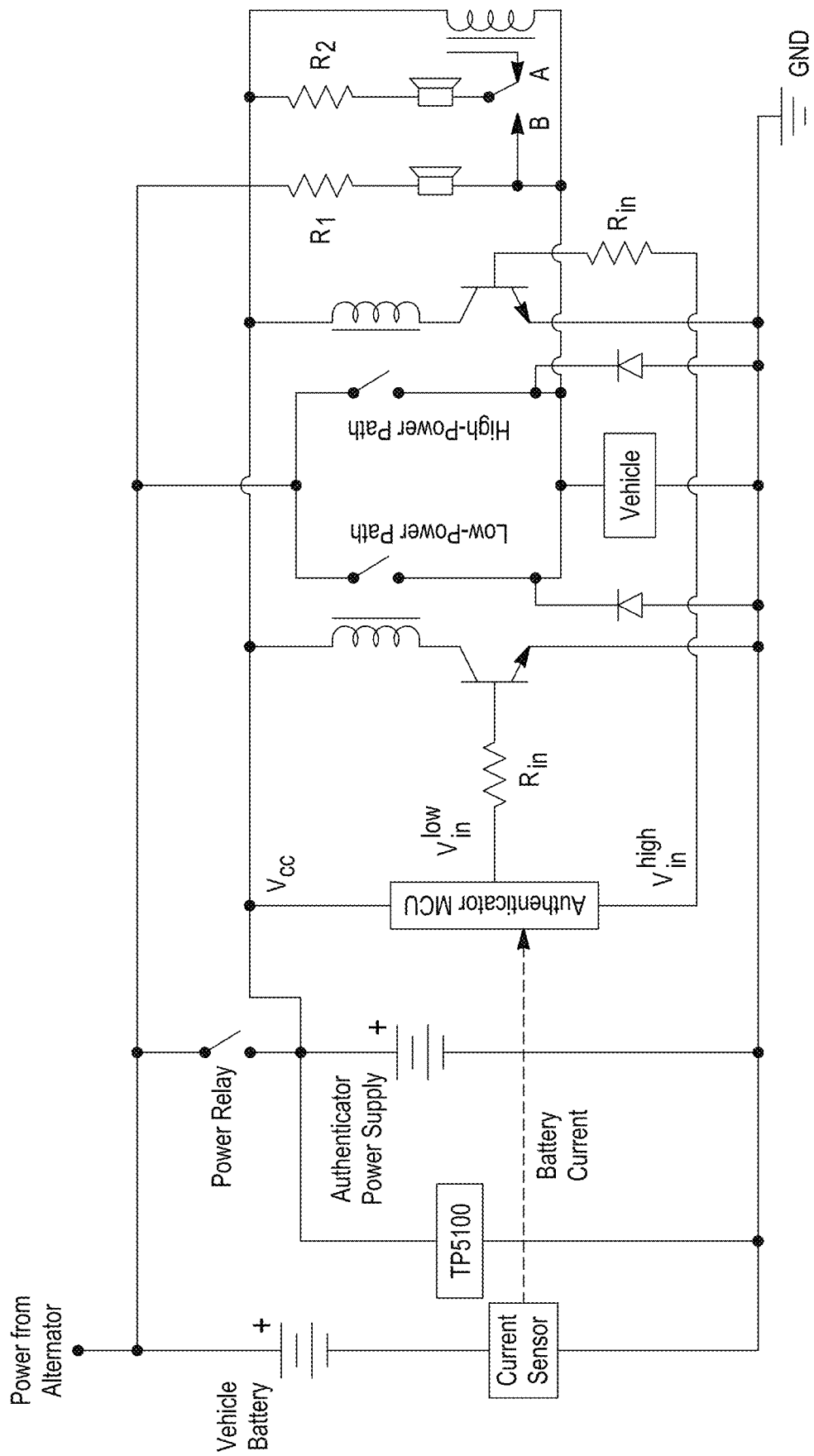

FIGS. 20A and 20B depict the example embodiment of the driving authentication system 10 after integrating the above rechargeable power supply circuits in the dongle and authenticator, respectively. In this example, Arduino Mega is used as the MCU for the dongle/authenticator, which outputs a Vcc of 5V; and the low-power path is rated at 50 A. The dongle/authenticator's sleep mode (i.e., when no authentication is needed) is implemented by disabling the ADC and blown-out detection of their MCUs. The dongle/authenticator is powered by Li-ion batteries whose recharging is implemented using TP5100 battery charging management chip. The driver-customized authentication code is stored in the non-volatile EEPROM of the authenticator's MCU. A pre-defined 4-digit reset code is stored in the EEPROM as well, keying in of which triggers the system's initiation/reset mode to allow its un/installation on vehicle and the customization/update of a driver's authentication code.

The driving authentication system is suitable for hybrid and electric vehicles as well. Albeit missing starter motors, hybrid and electric vehicles also require the activation of all related e-modules (and hence a larger power) to initialize their driving, thereby enabling the use of battery's power capacity to immobilize these vehicles.

The driving authentication system can be extended further to provide an entry control to vehicles, e.g., by integrating a second dongle with the door. The extended system will not only improve, but also have potential for replacing existing key/keyfob-based (im)mobilizers. Unlocking the vehicle doors requires an electric current of several amperes (e.g., 7.6 A), while that needed to maintain the monitoring functions of a parked vehicle is only in the order of milliampere—one can connect the vehicle and the battery with a very-low-power path which is strong enough to support the monitoring functions but not unlocking the door, and switch to the low-power path (and hence allow unlocking doors) after successfully validating a driver's entry privilege using the PLC.

Lastly, the driving authentication system can be extended to authenticate drivers using information other than password, which has been corroborated by adding a PM10A fingerprint sensor to the dongle—the dongle transmits the customized password when the bio-fingerprint-based authentication is successful. Other biometric devices are also contemplated by this disclosure.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

What is claimed is:

1. A driving authentication system for a vehicle, comprising:
    a dongle interfaced with a battery of the vehicle and operates to modulate discharge current from the battery with an input code;
    a data store storing one or more authentication codes for the vehicle; and
    an authenticator configured to receive a discharge current from the battery and operates to demodulate the input code from the discharge current, wherein the authenticator compares the input code to the one or more authentication codes and, in response to the input code matching one of the one or more authentication codes, controls power capacity of the battery.

2. The driving authentication system of claim 1 wherein the authenticator restricts power capacity of the battery to an electric starter motor of the vehicle in response to a mismatch between the input code and the one of the one or more authentication codes.

3. The driving authentication system of claim 1 wherein the dongle is interfaced via 12 volt power network of the vehicle to the battery.

4. The driving authentication system of claim 1 wherein the discharge current is modulated using frequency-shift keying.

5. The driving authentication system of claim 1 wherein the discharge current is in form of a periodic waveform and the input code is comprised of two or more alphanumeric characters, such that value of an alphanumeric character is represented by frequency of the period waveform.

6. The driving authentication system of claim 1 wherein the dongle includes a user input device for inputting the input code.

7. The driving authentication system of claim 1 further comprises
    a switching circuit interconnecting the battery with an electric starter motor, wherein the switching circuit includes a low power circuit path, a high power circuit path and one or more switches that selectively connects the battery via the low power circuit path or the high power circuit path to the electric starter motor; and
    a controller interfaced with the one or more switches, wherein the controller controls power capacity of the battery by actuating the switch.

8. The driving authentication system of claim 1 further comprise a relay interconnected between an alternator of the vehicle and at least one of the dongle or the authenticator, wherein the at least of the dongle and the authenticator includes a rechargeable power supply and the relay is closed while engine of the vehicle is running, thereby recharging the rechargeable power supply.

9. A driving authentication system for a vehicle, comprising:
    a transmitter circuit electrically coupled across a battery of the vehicle, where the transmitter circuit is configured to discharge a current from the battery in response to receiving an input code and modulate the discharge current in accordance with the input code;
    a receiver circuit configured to receive the discharge current from the battery and operates to demodulate the input code from the discharge current;
    a switching circuit interconnecting the battery with a vehicle starter module, wherein the switching circuit includes a low power circuit path, a high power circuit path and at least one switch; and
    a controller interfaced with the receiver circuit and the switching circuit, wherein the controller controls position of the at least one switch in accordance with the input code received from the receiver circuit.

10. The driving authentication system of claim 9 further comprises a user input device interfaced with the transmitter circuit and configured to receive the input code from a user of the vehicle.

11. The driving authentication system of claim 10 wherein the transmitter circuit modulates the discharge current using frequency-shift keying.

12. The driving authentication system of claim 10 wherein the controller compares the input code from the receiver circuit with one or more known authentication codes and, in response to the input code matching one of the known authentication codes, changing the position of the at least one switch to electrically connect the battery through the high power circuit path to the vehicle starter module.

13. The driving authentication system of claim 10 wherein the at least one switch electrically connects the battery through the low power circuit path before authentication and the low power circuit path includes a circuit breaker.

14. The driving authentication system of claim 10 further comprises an alarm circuit configured to detect an open circuit in the low power circuit path and the high power circuit path and initiate an alarm in response thereto.

15. The driving authentication system of claim 10 further comprises an alarm circuit configured to detect removal of the receiver circuit and initiate an alarm in response thereto.

16. The driving authentication system of claim 10 further comprises an alarm circuit configured to detect removal of the transmitter circuit and initiate an alarm in response thereto.

* * * * *

UNITED STATES PATENT AND TRADEMARK OFFICE
CERTIFICATE OF CORRECTION

PATENT NO. : 11,814,009 B2
APPLICATION NO. : 17/703346
DATED : November 14, 2023
INVENTOR(S) : Kang G. Shin et al.

It is certified that error appears in the above-identified patent and that said Letters Patent is hereby corrected as shown below:

On the Title Page

At Column 1, Line number 3, item (73) Assignees, please delete "THE UNIVERSITY OF COLORADO" and insert -- THE REGENTS OF THE UNIVERSITY OF COLORADO --.

Signed and Sealed this
Tenth Day of September, 2024

Katherine Kelly Vidal
*Director of the United States Patent and Trademark Office*